United States Patent
Subbiah et al.

(10) Patent No.: US 9,248,406 B2
(45) Date of Patent: Feb. 2, 2016

(54) ON-LINE PERFORMANCE MANAGEMENT OF MEMBRANE SEPARATION PROCESS

(75) Inventors: Senthilmurugan Subbiah, Tamilnadu (IN); Babji Buddhi Srinivasa, Karnataka (IN)

(73) Assignee: ABB RESEARCH LTD, Zurich (CH)

( * ) Notice: Subject to any disclaimer, the term of this patent is extended or adjusted under 35 U.S.C. 154(b) by 347 days.

(21) Appl. No.: 12/856,249

(22) Filed: Aug. 13, 2010

(65) Prior Publication Data

US 2011/0035195 A1 Feb. 10, 2011

Related U.S. Application Data

(63) Continuation of application No. PCT/IB2008/000359, filed on Feb. 19, 2008.

(51) Int. Cl.
| | |
|---|---|
| B01D 61/12 | (2006.01) |
| B01D 61/10 | (2006.01) |
| B01D 61/02 | (2006.01) |
| B01D 61/08 | (2006.01) |

(Continued)

(52) U.S. Cl.
CPC ............ *B01D 61/12* (2013.01); *B01D 61/22* (2013.01); *B01D 65/02* (2013.01); *C02F 1/44* (2013.01); *B01D 2321/40* (2013.01); *C02F 1/441* (2013.01); *C02F 1/442* (2013.01); *C02F 1/444* (2013.01); *C02F 2103/08* (2013.01); *C02F 2209/001* (2013.01); *C02F 2209/003* (2013.01); *C02F 2209/005* (2013.01); *C02F 2209/03* (2013.01); *C02F 2209/05* (2013.01); *C02F 2209/40* (2013.01); *C02F 2303/16* (2013.01)

(58) Field of Classification Search
CPC ........ B01D 61/12; B01D 65/00; B01D 65/02; B01D 2321/40; B01D 2311/24; B01D 2311/16; B01D 2315/18; B01D 2315/20
See application file for complete search history.

(56) References Cited

U.S. PATENT DOCUMENTS

| | | | |
|---|---|---|---|
| 6,017,459 | A | 1/2000 | Zeiher et al. |
| 6,161,435 | A | 12/2000 | Bond et al. |

(Continued)

FOREIGN PATENT DOCUMENTS

DE 19748725 A1 5/1999

OTHER PUBLICATIONS

Cabassud et al. Neural networks: a tool to improve UF plant productivity. Desalination 145 (2002) 223-231.*

(Continued)

*Primary Examiner* — Katherine Zalasky
(74) *Attorney, Agent, or Firm* — Buchanan Ingersoll & Rooney PC

(57) ABSTRACT

Method for on-line prediction of performance of an RO based desalination plant is disclosed. The method includes: (i) a mathematical model of the RO unit; (ii) on-line estimation of membrane physical parameters of the nonlinear mathematical model representing the RO unit; and (iii) analysis of the estimated membrane transport parameter with respect to time. Based on the analysis of these estimated parameters, plant operators can clean the membranes to restore the performance of the RO desalination plant. The method can be implemented in a computer based control system used for data acquisition and control of an RO based desalination plant. The method can help in maintaining the performance of the RO based desalination plants at a desired level and increase membrane life without affecting quality of permeate water produced.

12 Claims, 3 Drawing Sheets

(51) Int. Cl.
*C02F 1/44* (2006.01)
*B01D 61/22* (2006.01)
*B01D 65/02* (2006.01)
*C02F 103/08* (2006.01)

(56) References Cited

U.S. PATENT DOCUMENTS

| | | | |
|---|---|---|---|
| 6,475,394 | B2 | 11/2002 | Xiong et al. |
| 6,699,684 | B2 | 3/2004 | Ho et al. |
| 6,730,227 | B2 | 5/2004 | Zeiher et al. |
| 6,821,428 | B1 | 11/2004 | Zeiher et al. |
| 6,838,001 | B2 | 1/2005 | Zeiher et al. |
| 6,838,002 | B2 | 1/2005 | Zeiher et al. |
| 7,060,136 | B1 | 6/2006 | Zeiher et al. |
| 7,169,236 | B2 | 1/2007 | Zeiher et al. |
| 7,252,096 | B2 | 8/2007 | Gill et al. |

OTHER PUBLICATIONS

Delgrange-Vincent et al. Neural networks for long term prediction of fouling and backwash efficiency in ultrafiltration for drinking water purification. Desalination 131 (2000) 353-362.*
Ramamurti Rangarajan et al., "Predictability of Reverse Osmosis Performance of Porous Cellulose Acetate Membranes for Mixed Uni-Univalent Electrolytes in Aqueous Solutions," Ind. Eng. Chem. Process Des. Dev., 1978, pp. 46-56, vol. 17, No. 1, American Chemical Society.
O. Kedem et al., "Thermodynamic Analysis of the Permeability of Biological Membranes to Non-Electrolytes," Biochimica et Biophysica Acta, 1958, pp. 229-246, vol. 27.
M.W. Vonk et al., "Positive and Negative Ion Retention Curves of Mixed Electrolytes in Reverse Osmosis with a Cellulose Acetate Membrane. An Analysis on the Basis of the Generalized Nernst-Planck Equation," Journal of Colloid and Interface Science, Nov. 1983, pp. 121-134, vol. 96, No. 1, Academic Press, Inc.
Mohammad Soltanieh et al., "Review of Reverse Osmosis Membranes and Transport Models," Chem. Eng. Commun., 1981, pp. 279-363, vol. 12, Gordon and Breach, Science Publishers, Inc., USA.
Z.V.P. Murthy et al., "Thin Film Composite Polyamide Membrane Parameters Estimation of Phenol-Water System by Reverse Osmosis," Separation Science and Technology, 1998, pp. 2541-2557, vol. 33, No. 16, Marcel Dekker, Inc.

International Search Report for PCT/IB2008/000359, completed Sep. 24, 2008.
D 4516-00, Standard Practice for Standardizing Reverse Osmosis Performance Data, pp. 1-3, ASTM, West Conshohocken, PA.
J.G. Wijmans et al., "The Solution-Diffusion Model: A Review," Journal of Membrane Science, 1995, pp. 1-21, vol. 107, Elsevier Science B.V.
K.S. Spiegler et al., "Thermodynamics of Hyperfiltration (Reverse Osmosis): Criteria for Efficient Membranes," Desalination, 1966, pp. 311-326, vol. 1.
Mohammad Soltanieh et al., "Interaction Effects in Multicomponent Separation by Reverse Osmosis," Journal of Membrane Science, 2001, pp. 15-27, vol. 183, Elsevier Science B.V.
Xiao-Lin Wang et al., "Transport of Organic Electrolytes with Electrostatic and Steric-Hindrance Effects Through Nanofiltration Membranes," Journal of Chemical Engineering, pp. 372-380, Japan.
Grishma R. Shetty et al., "Predicting Membrane Fouling During Municipal Drinking Water Nanofiltration Using Artificial Neural Networks," Journal of Membrane Science, 2003, pp. 69-86, vol. 217, Elsevier Science B.V.
E.A. Mason et al., "Statistical-Mechanical Theory of Membrane Transport," Journal of Membrane Science, 1990, pp. 1-81, vol. 51, Elsevier Science Publishers, B.V., Amsterdam.
S. Senthilmurugan et al., "Modeling of a Spiral-Wound Module and Estimation of Model Parameters Using Numerical Techniques," Desalination, 2005, pp. 269-286, vol. 173, Elsevier B.V.
Abhijit Chatterjee et al., "Modeling of a Radial Flow Hollow Fiber Module and Estimation of Model Parameters Using Numerical Techniques," Journal of Membrane Science, 2004, pp. 1-16, vol. 236, Elsevier B.V.
S. Senthilmurugan et al., "Hydrodynamics Studies in Radial Flow Hollow Fiber Reverse Osmosis Module," International Conference on Modeling and Simulation, Coimbatore, Aug. 2007, pp. 27-29.
Mohamad Amin Saad, "Early Discovery of RO Membrane Fouling and Real-Time Monitoring of Plant Performance for Optimizing Cost of Water," Desalination, 2004, pp. 183-191, vol. 165, Elsevier B.V.
Ooe Kenji et al., "'eCUBE aqua' Application Portfolio for Reverse Osmosis Membrane Diagnosis," Yokogawa Technical Report, English Edition, 2004, pp. 18-22, No. 38.
Masaaki Sekino, "Mass Transfer Characteristics of Hollow Fiber RO Modules," Journal of Chemical Engineering of Japan, 1995, pp. 843-846, vol. 28, No. 6, Japan.

* cited by examiner

ON-LINE PERFORMANCE MANAGEMENT OF MEMBRANE SEPARATION PROCESS

RELATED APPLICATION

This application claims priority as a continuation application under 35 U.S.C. §120 to PCT/IB2008/000359 filed as an International Application on Feb. 19, 2008 designating the U.S., the entire content of which is hereby incorporated by reference in its entirety

FIELD

The present disclosure relates to on-line performance monitoring, such as monitoring of reverse osmosis/nanofiltration plants by analyzing physical parameters of a membrane using a membrane transport phenomenological model.

BACKGROUND INFORMATION

Reverse Osmosis/Nanofiltration/Ultrafiltration (RO/NF/UF) is a pressure driven membrane separation process used in various industries such as desalination, wastewater treatment and chemical manufacturing. RO/NF/UF is used in plants to produce potable water from sea/brackish water. In an RO/NF/UF process, high pressure is applied on the feed side of the membrane to overcome the osmotic pressure of solute and cause transport of the solvent from the feed side to a permeate side and solute accumulates near the membrane surface. As a result, the concentration of the solute near the membrane surface increases gradually over a period, adversely affecting the performance of membrane. This phenomena is called concentration polarization. The concentration polarization is inversely proportional to the feed velocity across the membrane module. As recovery increases, the flow velocity across the membrane decreases, causing increased concentration polarization. Product recovery depends on other variables like feed concentration, pressure and temperature. In RO/NF/UF plants, the membrane fouling rate due to concentration polarization is influenced by multiple factors such as changes in feed concentration, temperature, and pressure, and it is difficult for the plant operator to determine the root cause for a changing fouling rate in a RO/NF/UF plant. Prediction of the changes in the fouling rate would help the plant operators in taking maintenance actions like cleaning the membrane to restore the performance to a desired level.

In industry, cleaning of the membrane is carried out in at least two ways; either based on a pressure drop between the feed and reject being more than a threshold value, or at predetermined fixed periodic intervals as per a recommendation by a membrane manufacturer. In the first method, the membrane may get damaged due to permanent fouling, and in the second method, membrane cleaning is independent of the actual fouling taking place in the membrane modules. Thus, both these methods of membrane cleaning are not satisfactory since the fouling rate changes with time and is dependent on the feed flow rate, concentration, pressure and temperature.

Different methods have been reported in literature for online cleaning and performance monitoring of a membrane separation process. Ooe Kenji and Okada Shingo [28] reported online method for performance analysis of an RO plant based on an ASTM D-4516 [1] method. The ASTM D-4516 method does not allow for discovering the development of membrane fouling or scaling until it results in significant loss of product quality such as product flow, and salt passage. In addition, this technique is applicable only where the plant is operated as per the design conditions and capacity with recovery being equal to or less than 15%.

Mohamad Amin Saad [16] extended the ASTM method to measure "Fouling Monitor" (FM) to monitor the performance of an RO plant. The FM is defined as a percentage difference between the normalized flux at design conditions and actual flux at the operating conditions of the RO plant. A cleaning scheduling of a membrane is arrived at based on the value of the FM. This method cannot predict the fouling of the membrane based on the operating conditions before normalized flux deviates from a design value. In addition, the method based on normalized flux may not be sufficient to predict fouling of a membrane accurately.

Nalco chemical company [18-27] has developed a method for monitoring the performance of a membrane separation process. As per the method, a tracer is injected in the feed stream and the concentration of tracer in outlet streams was estimated experimentally by using external sensors. The tracer concentrations in the feed and the outlet streams are used to monitor the fouling taking place in the membrane separation processes. This technique involves external sensors and tracer injection systems for implementation.

University Technology Corporation [U.S. Pat. No. 6,161, 435] has developed a method and apparatus for monitoring membrane modules by using an ultrasonic sound technique. Due to fouling, the membrane thickness increases from the original value. Cleaning of the membrane is scheduled based on the monitoring of the membrane thickness using an ultrasonic technique. This method involves an individual ultrasonic transducer to monitor fouling at each membrane module.

The methods described above are not based on actual plant operating conditions and do not account for any time varying nature of fouling taking place in the membrane units.

Several mathematical models dealing with solute transfer in a membrane separation process have been reported in literature. Broadly, these membrane transport models may be divided in two categories (i) for neutral (reverse osmosis) membranes and (ii) for charged (nanofiltration and charged reverse osmosis) membranes. The mathematical models like preferential sorption-capillary flow model [2], Solution Diffusion model [3], Irreversible Thermodynamic model (Kedem-Katchalsky model [4] and Spiegler-Kedem model [5]), and Langmuir-type model [6] have been used for neutral membranes. In the case of charged membranes, the Nernst-Planck equation [7], electrostatic and steric hindrance model [8] have been used. Data driven models based on neural networks [9] have also been used to predict both permeate concentration and flux without solving any membrane transport equation.

Models proposed for charged membranes are developed by considering the chemical and physical properties of the solute and membrane such as solute size, solute charge, pore size of membrane and charge of membrane etc. On the other hand models based on the irreversible thermodynamics [4, 5] are developed by considering the membrane as a black box which has fluxes (permeate and solute flux) corresponding to the driving forces (pressure difference and concentration difference) of the transport process. The phenomenological constants are used to correlate flux and driving force, and physical parameters of the membrane are derived from these phenomenological constants. With irreversible thermodynamic models, the physical parameters of the membrane can be estimated for experimental data without knowing properties of membrane and solute. Soltanieh and Gill [10] compared the performance of the SK model and the KK model and observed that at no fouling condition, the membrane physical parameters of the KK model were found to be a function of feed concentration, while SK model parameters were found to be constant with respect to feed concentration. Several authors [11] compared the Solution Diffusion (SD) model with the SK model and concluded that the SK model predicts better than the SD model.

Murthy and Gupta. [12] proposed new a model, namely a Combined Film Spiegler-Kedem (CFSK) model, by including both membrane transport and concentration polarization effects. They concluded that CFSK model predictions are better than other models available in literature. Senthilmurugan et al [13] and Abhijit et al., [14] extended the CFSK model to spiral wound and hollow fiber modules respectively, and validated the models with experimental data with good results.

SUMMARY

A method is disclosed for real time performance management of membrane separation processes, comprising: predicting a state of fouling of a membrane based on an estimation of a time varying physical parameter of the membrane from plant data; and scheduling cleaning of the membrane based on a comparison of an estimated time varying physical parameter with a pre-defined threshold value.

A system is disclosed for real time performance management of a membrane separation process by performing a computer implemented program on a computer to implement a method comprising: predicting a state of fouling based on estimation of a time varying physical parameter of a membrane from plant data; and scheduling cleaning of the membrane based on a comparison of an estimated time varying physical parameter with a pre-defined threshold value.

A system is disclosed for real time estimation of a time varying physical parameter of a membrane separation process from plant data, comprising: means to measure a plant process variable in real-time; means to store a real-time measurement of plant operation data in a computer based control system; means to process the plant operation data stored in the computer based control system to remove noise; means to estimate a physical parameter of a membrane using a mathematical model; and means to store an estimated physical parameter in the computer based control system.

BRIEF DESCRIPTION OF THE DRAWINGS

Other features and advantages will become apparent to those skilled in the art upon reading the description of the preferred exemplary embodiments in conjunction with the accompanying drawings, wherein.

DETAILED DESCRIPTION

Exemplary embodiments can implement an on-line method that can analyze available plant data in terms of fouling of membranes and suggest an appropriate membrane cleaning schedule to plant operators to maintain the performance of the RO plant and also extend the life of the membrane. So far, such on-line performance monitoring methods based on a membrane transport phenomenological model have not been reported for RO/NF/UF plants and the present disclosure is aimed at filling such a gap.

In the present disclosure, an exemplary method for real-time estimation of a state of fouling and cleaning scheduling for RO/NF/UF plant is proposed. An exemplary method includes periodically executing the following steps: (i) using a phenomenological model to calculate the performance of an RO/NF/UF plant; (ii) on-line estimation of a membrane transport parameter of a phenomenological model at periodic intervals; and (iii) analysis of the membrane transport parameter to determine the state of the fouling of the membrane.

The following exemplary physical parameters of the membrane are estimated online:

Hydrodynamic permeability of membrane (A)

Solute permeability i.e. Permeability of solute with respect to membrane (Pm)

Reflection coefficient of membrane ($\sigma$)

The present disclosure provides for performance monitoring of a membrane unit through online analysis of physical parameters of the phenomenological model of the membrane transport process. This method provides information about the time varying rate of fouling in a membrane unit, which can be used in scheduling of the membrane cleaning.

Figure 3:
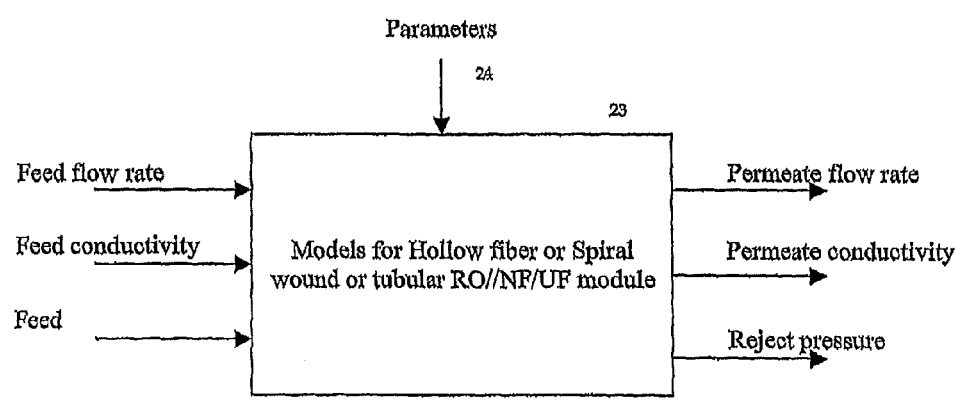
FIG. 3 is an exemplary schematic of a mathematical model.

A proposed on-line performance monitoring method includes:

A mathematical model for both hollow fiber and spiral wound membrane modules with listed inputs (model parameters, feed flow rate, conductivity and pressure) and outputs (permeate flow rate, permeate conductivity, and reject pressure) as shown in FIG. 3.

Online estimation of both physical parameters of the membrane and parameters related to the configuration of a membrane module by minimizing the error between measured and predicted values of permeate conductivity, flow rate, and reject pressure. A non-linear optimization technique can be used for minimizing the error between the predicted and measured values.

Online validation of a developed RO/NF/UF unit model with plant data by comparing the model predicted values with actual operation data from the plant.

Online estimation of physical parameters of the membrane in a regular time interval by minimizing the error between the measured and predicted values of permeate conductivity, flow rate, and reject pressure. A non-linear optimization technique can be used for minimizing the error between the predicted and measured values.

Analysis of the estimated membrane transport parameter by comparing the current estimated parameter values with predefined threshold values. If the values of the current estimates of the parameter values is more than the threshold values, recommend cleaning of the membranes.

Figure 1:
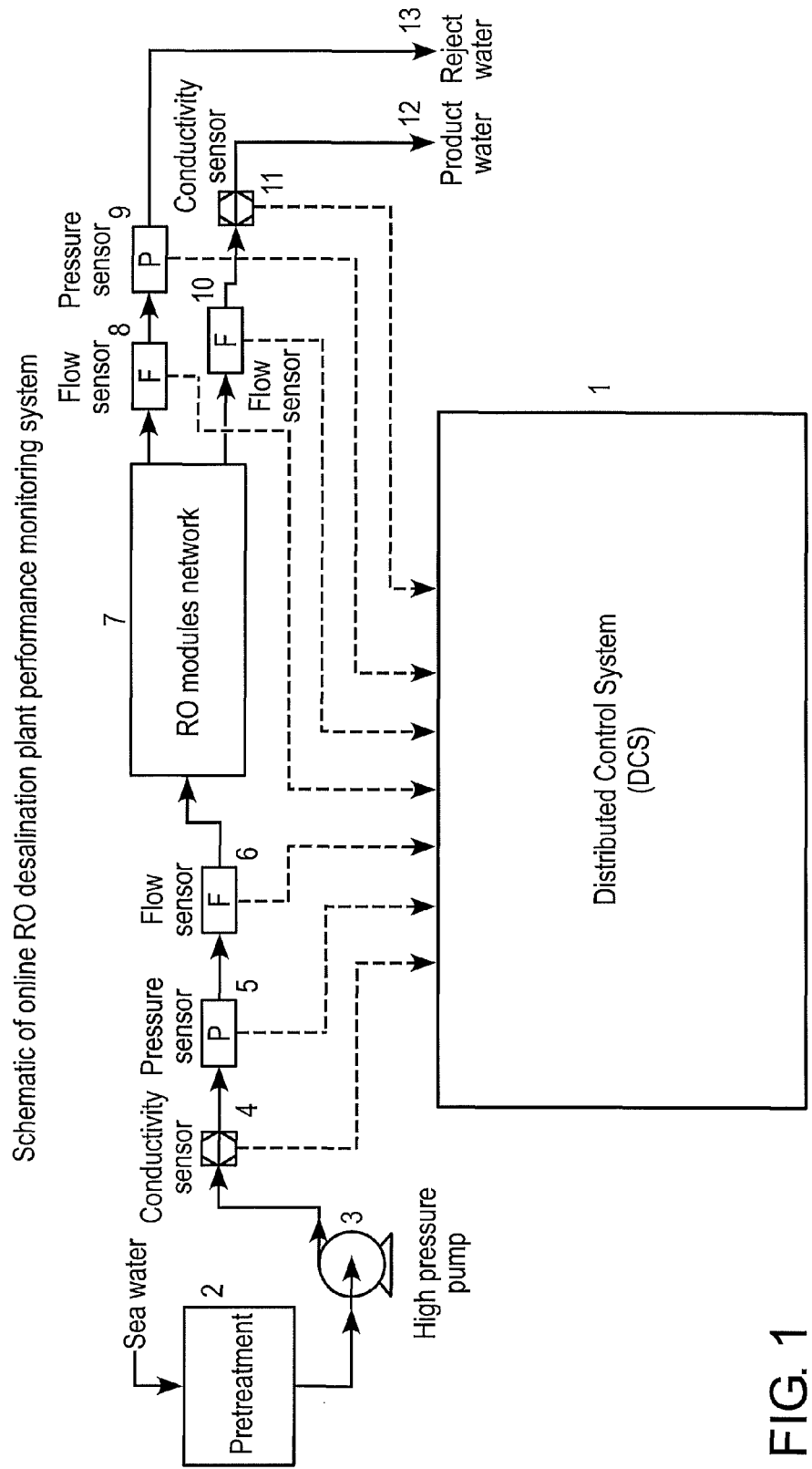
FIG. 1 is schematic of an exemplary RO/NF/UF plant with an associated instrumentation and control system.

FIG. 1 illustrates a schematic of an RO/NF/UF plant with associated instrumentation and plant control system The RO/NF/UF based desalination plant has following streams, namely feed, reject and permeate streams. The feed is pretreated 2 before being pumped to RO/NF/UF membrane module through high pressure pump 3. The properties of the feed stream such as conductivity, pressure and flow rate are measured by corresponding sensors 4, 5, 6. The RO Modules network 7 is connected to the sensors 6 and 8, the RO/NF/UF membrane module purifies the feed water and purified water is collected at a permeate end and concentrated water is collected at a reject end. The process variables such as reject flow rate and pressure are measured at corresponding sensors 8, 9. Similarly, other process variables such as permeate flow rate and conductivity are measured by corresponding sensors 10, 11. This measured data from sensors are stored in plant control system 1. These measurements are carried under two conditions such as (i) normal operating conditions and (2) introducing at least one disturbance such as a step change in any one process variable.

Figure 2:
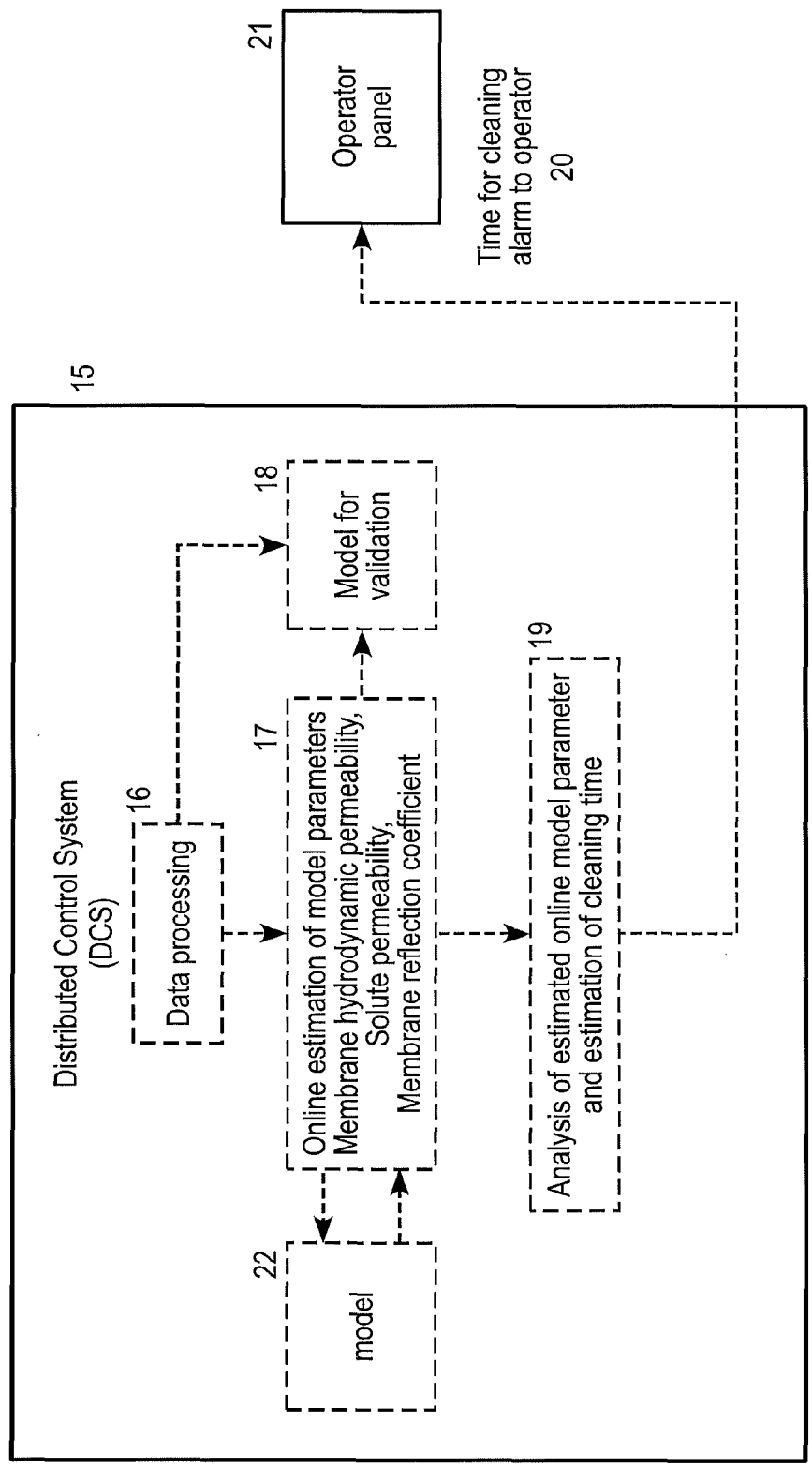
FIG. 2 is an exemplary schematic of on-line performance monitoring system of an RO/NF/UF plant.

FIG. 2 illustrates an exemplary schematic of the online performance monitoring system of an RO/NF/UF plant using mathematical model 22 and analysis of the estimated model parameters, which change with time depending upon the plant operating conditions.

Various exemplary steps involved in online parameter estimation method are:

The data stored in Distributed Control System 1 is processed 16 to remove the noise.

Estimation of model parameters or physical parameters of membrane 17

Validation of model parameter 18.

Analysis of model parameter 19.

Recommendation goes to the operator panel 21 for cleaning, on expiry of the estimated time 21.

The parameter estimation can be carried out by minimizing the error between the predicted and measured process variable under normal operating conditions. The error minimization can be performed by a non-linear optimization technique. Further estimated model parameters are used to validate the model using measured process variables.

FIG. 3 illustrates an exemplary mathematical model of an RO/NF/UF plant. The mathematical model for the membrane module will change depending upon the configuration of the module used in a plant, namely a Hollow Fiber (HF) module or a Spiral Wound (SW) module or a tubular module 23. A brief description of the mathematical models of both HF and SW modules is outlined below Model for HF Module The permeate flow rate and solute concentration obtained from a given HF module can be predicted [14] by solving a set of equations which describe the mass transfer processes in the module. These equations namely, the membrane transport model, concentration polarization model, local solvent and solute mass balances are all applicable at any point within the permeator. The system of coupled differential equations may be solved numerically using the finite difference method.

The following assumptions have been made in the development of our analysis:

The bulk stream flows radially outward and there is sufficient axial mixing in the bulk stream. This implies that the bulk flow variables are only dependent on r and it allows for replacing the partial derivative terms that appear in the material balance equations and the pressure drop equation with ordinary derivatives.

The element chosen for finite difference analysis within the permeator is much larger than the fiber dimensions. Hence, for all practical purposes the shell side of the membrane can be assumed to be a continuous phase.

Membrane structure is uniform throughout the module. All model parameters within the permeator are constant.

There is no variation in bulk flow properties of the feed stream.

Solution contains only one salt and a solvent (binary solution).

Film theory is applicable within the membrane module.

Fluid properties and diffusivities remain constant inside the module.

By combining the membrane transport equation of Spiegler-Kedem [5] model and film theory based concentration polarization model [12] equation, we obtain:

$$\text{Permeate flux}(m^3/m^2 \cdot s): J_v = \frac{A}{\rho}\left[(P_b - P_p) - \sigma\frac{vR_GT}{M_w}\phi C_b\left(\frac{1-F}{\frac{1-F}{\phi} + \frac{1-\sigma}{\sigma}}\right)\right] \quad (1)$$

Where A is membrane hydrodynamic permeability (m³/m²·s·Pa), $\sigma$ is reflection coefficient of membrane (−), $\rho$ is density of sea water, $P_b$ and Pp are pressures of feed side bulk stream and permeate stream at membrane local point (Pa), $v$ is vont-hoff factor of solute (−), $R_G$ is gas constant (J·kmol$^{-1}$·°K$^{-1}$), T is temperature (°K), $M_w$ is molecular weight of solute (kg/kmol), $\phi$ is concentration polarization defined by equation (3), $C_b$ is concentration of bulk feed at membrane local point (kg/m³), F is intermediate dummy variable which defined by equation (3), $$\text{Permeate concentration: } C_p = \frac{C_b}{1 + \frac{\sigma}{1-\sigma} \cdot \frac{1-F}{\phi}} \quad (2)$$

$$\text{Where, } \phi = \exp\left(\frac{J_v}{k}\right), \text{ and } F = \exp\left(-J_v\frac{1-\sigma}{P_m}\right) \quad (3)$$

Where, $P_m$ is solute permeability (m/s).

The mass transfer coefficient (k) used in equation (3) can be expressed as a function of the Reynolds and Schmidt numbers.

$$Sh = aRe^b Sc^{1/3} \quad (4)$$

Equations of the same form are used in literature for estimating the mass transfer coefficients. The values of 'a' and 'b' for a hollow fiber module have been reviewed by Masaaki Sekino [29] for an HFRO module.

The pressure difference across the membrane which is used in equation 1 for obtaining the permeate flux varies throughout the membrane because of friction losses. The pressure drop for the permeate and bulk streams can be estimated using a Hagen-Poiseuille equation and the modified Ergun's [15] equation respectively. These equations are given below $$\text{Hagen-Poiseuille equation: } \frac{d}{dz}P_p = -\frac{32\mu}{d_i^2}v_p \quad (5)$$

Where $v_p$ is permeate velocity (m/s) at inside the fiber bore, $d_i$ is an inside diameter of hollow fiber (m), $\mu$ is viscosity of water (Pa·s), z is axial coordinate The modified Ergun [15] equation for pressure drop per length of the packed bed at a turbulent condition can be written as $$\frac{\partial P_b}{\partial r} = c \cdot v_r^d \cdot J_v^e \quad (6)$$

Where, $v_r$ is superficial velocity of feed stream (m/s), c, d, e constants are used in equation (6).

The material balance equations for both solute and solvent streams within the module are given below $$\text{Permeate stream: } \frac{d}{dz}v_p = J_v \zeta / \theta \text{ such that } BC, \quad (7)$$

$$v_p |_{z=0} = 0, \; 0 \le z \le L$$

$$\text{Here } \theta = \frac{d_i^2 N}{D_o^2 - D_i^2}, \; \zeta = \frac{4\theta d_o}{d_i^2} \cdot \frac{L}{L_m}.$$

The length of a hollow fiber is given as, $L = \sqrt{L_m^2 + 4(\pi r W)^2}$
$L_m$ is length of module (m).
Bulk stream solute concentration:

$$\frac{d}{dr}(rv_r) = -\theta \frac{rv_p}{L}\bigg|_{z=L} \quad (8)$$

subject to BC, $v_r|_{r=D_i/2} = v_F$
$v_F$ is velocity of feed at feed header (m/s)
Likewise for the solute, $$\frac{d}{dr}(rv_r C_b) = -\theta \frac{rv_p C_p}{L}\bigg|_{z=L} \quad (9)$$

subject to BC, $C_b|_{r=D_i/2} = C_F$ for $D_i/2 \le r \le D_o/2$
$C_F$ is feed concentration (kg/m³).
Differentiation of equation (3.8) and subsequent substitution into equation (3.11) leads to:

$$\frac{d^2}{dz^2}P_p = -\frac{32\mu}{d_i^2} \cdot \frac{\zeta}{\theta} \cdot J_v \; BC \begin{cases} \frac{d}{dz}P_p \big|_{z=0} = 0 \\ P_p = P_{atm} - l_s \cdot \frac{32\mu}{d_i^2} v_p \big|_{z=L} \end{cases} \quad (10)$$

Where, $I_s$ is length of epoxy seal (m), $P_{atm}$ is atmosphere pressure (Pa).

The above equations (1) to (9) are solved numerically by the finite difference method with each of the variables being expressed as a discrete value. Since the permeate flow variables vary only along the z-axis while the bulk flow terms vary along the r-axis, the equations are solved sequentially by proceeding from $r=D_i/2$ to $D_o/2$ while solving all the z-axis dependent difference equations at a particular radial grid location. The bulk flow terms at $r=D_i/2$ are known; $P_b=P_F$, $C_b=C_F$ and $v_r=V_F$.

Model for SW Module
The following assumptions have been made in the development of our analysis.
  Membrane structure is uniform throughout the module. All model parameters within the permeator are constant.
  There is no variation in bulk flow properties.
  Solution contains only one salt and a solvent (binary solution).
  Film theory is applicable within the membrane module.
  Fluid properties and diffusivities remain constant inside the module.
The mass transport equations of membrane will be same for both HF and SW modules. Therefore, the equations 1-4 are solved with the following pressure drop and mass balance equation given below for SW module [13].

The pressure drop in both the channels is based on the assumption that Darcy's law is applicable. This leads to the following expression for the pressure drops:

$$\text{Feed Channel: } \frac{dP_b}{dx} = k_{fb} \cdot \mu \cdot U_b \quad (10)$$

$$\text{Permeate Channel: } \frac{dP_p}{dy} = k_{fp} \cdot \mu \cdot U_p \quad (11)$$

Where: $k_{fb}$ is the friction parameter in the feed channel (1/m²), $k_{fp}$ is the friction parameter in the permeate channel (1/m²), $U_b$, $U_p$ is the velocity of the solution in feed and permeate channels (m/s) and $\mu$ is the viscosity of solution (Pa·s). Here both friction parameters are experimentally determined for a given module, and x and y are directions of feed and permeate flow when in a module unwind condition.

The overall material balance for the feed and the permeate sides are given by the following equations:

$$\frac{dU_b}{dx} = -2J_v / h_b \quad (12)$$

$$\frac{dU_p}{dy} = 2J_v / h_p \quad (13)$$

Where, $h_b$, $h_p$ are thickness of feed and permeate side spacer (m).
Similarly the material balance for the solute on the feed side is represented by the following equation:

$$\frac{dU_b C_b}{dx} = -2J_v C_p / h_b \quad (14)$$

Differentiating equation (10) with respect of "x" and substituting in equation (12), we obtain:

$$\frac{d^2 P_b}{dx^2} = 2k_{fb}\mu J_v / h_b \quad (15)$$

with boundary conditions $$P_b = P_F \text{ at } x = 0$$

and $$P_R = P_F + \int_0^L \left(\frac{dP_b}{dx}\right) dx \text{ at } x = L$$

Similarly differentiating equation (11) with respect to y and substituting in equation (13) we obtain:

$$\frac{d^2 P_p}{dy^2} = -2k_{fp}\mu J_v / h_p \quad (16)$$

with boundary conditions:

$$P_p = P_{atm} \text{ at } y = w$$

and at $y = 0$, $$P_{pw} = P_{atm} - \int_0^w \left(\frac{dP_b}{dy}\right) dy$$

$P_R$ is reject pressure (Pa), L is length of spiral wound module (m), and w=width of module with respect to number of wounds (m).

The above equations are solved using the method of finite differences. The feed flow path (x direction) is divided into m segments while the permeate flow path (y direction) is divided into n segments.

By solving the above model equations of HF and SW modules, the permeate flux, and concentration at local points of the membrane module can be estimated. The overall permeate concentration and flow rate can be estimated by the following equations:

$$Q_p = \int_{x=0}^{x=m} \int_{y=0}^{x=n} J_v S_m dy dx \quad (17)$$

$$C_{pt} = \int_{x=0}^{x=m} \int_{y=0}^{x=n} J_v S_m C_p dy dx \quad (18)$$

Where $S_m$ is surface area of a membrane corresponding finite element.

The exemplary lists of physical parameters 24 used in the model are:
- Membrane hydrodynamic permeability (A)
- Reflection coefficient of membrane (σ)
- Solute permeability ($P_m$)
- The constants of mass transfer coefficients correlation (a and b)
- The constants of modified Ergun's equation for HFRO module (c, d, e) or Darcy's law constant for feed and permeate channel for spiral wound module ($k_{fb}$, $k_{fp}$).

The conductivity of permeate can be estimated from the permeate concentration.

The above described mathematical models are used in the present method to describe the physical phenomena occurring in membrane separation processes. The models include parameters such as solute permeability, hydrodynamic permeability and membrane reflection coefficient to characterize the fouling phenomena. These model parameters are time varying in nature and are estimated periodically from the RO plant data such as flow rate, temperature, pressure and quality of feed, reject and permeate. Analysis of these estimated parameters will indicate the rate of fouling taking place in the RO plant and the cleaning of the membrane is recommended whenever the values of these parameters exceed a pre-defined threshold value.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

References, all of which are incorporated herein by reference in their entireties and referenced by number in the specification.

1. ASTM D4516-00 (2006)e1 Standard Practice for Standardizing Reverse Osmosis Performance Data
2. R. Rangarajan, T. matsuura, E. C. Goodhe, and S. Sourrirjan, Predictability of reverse osmosis performance of porous cellulose acetate membranes for mixed uni-valent electrolytes in aqueous solutions, Ind. Eng. Chem. Prod. Des. Dev, 17 (1978) 46-56
3. J. G. Wijmans and R. W. Baker, The solution-diffusion model: a review, Journal of Membrane Science 107 (1995) 1-21
4. O. Kedem and A. Katchalsky, Thermodynamic analysis of the permeability of biological membranes to non electrolytes, Biochim. Bio-Phys. Acta. 27 (1958) 229.
5. K. S. Spiegler and O. Kedem, Thermodynamics of hyperfiltration (reverse osmosis): criteria for efficient membranes, Desalination 1 (1966) 311-326.
6. M. Soltanieh, and S. Sahebdelfar, Interaction effects in multi-component separation by reverse osmosis, J. Membr. Sci, 183 (2001) 15-27
7. M. W. Vonk and J. A. M. Smit, Positive and negative ion retention curves of mixed electrolytes in reverse osmosis with a cellulose acetate membrane. An analysis on the basis of the generalized Nernst-Planck equation, J. of Colloid and Interface Sci., 96 (1983) 121-134
8. X. Wang, T. Tsuru, M. Togoh S.-I. Nakao and S. Kimura, Transport of organic electrolytes with electrostatic and steric-hindrance effects through Nan filtration membranes, J. Chem. Engg. Japan, 28 (1995) (372-380)
9. Grishma R. Shetty a, Shankararaman Chellam, Predicting membrane fouling during municipal drinking water nanofiltration using artificial neural networks, J. Membr. Sci., 217 (2003) 69-86
10. M. Soltanieh and W. N. Gill, Review of reverse osmosis membranes and transport models, Chemical Engg. Comm., 12 (1981) 279
11. A. Mason, H. K. Lonsdale, Statistical mechanical theory of membrane transport, J. Membr. Sci. 51 (1990) 1.
12 Z. V. P. Murthy and S. K. Gupta, Thin film composite polyamide membrane parameters estimation for phenol-water system by reverse osmosis, Sep. Sci. Technol., 33(16)(1998) 2541E.
13 S. Senthilmurugan, Aruj Ahluwalia and Sharad K. Gupta, Modeling of a spiral wound reverse osmosis module and estimation of model parameters using numerical techniques", Desalination, 173, 269-286, 2005
14 Abhijit Chatterjee, Aruj Ahluwalia, S. Senthilmurugan and Sharad K. Gupta, Modeling of a Radial flow hollow fiber module and estimation of model parameters using numerical techniques", Journal of Membrane Science, 236, 1-16, 2004
15. Senthilmurugan s and Babji B S, Hydrodynamics studies in radial flow hollow fiber reverse osmosis module, International Conference on Modeling and Simulation, Coimbatore, 27-29 Aug. 2007
16. Mohamad Amin Saad, Early discovery of RO membrane fouling and real-time monitoring of plant performance for optimizing cost of water, Desalination 165 (2004) 183-191
17. U.S. Pat. No. 6,161,435 Method and apparatus for determining the state of fouling cleaning of membrane modules
18. U.S. Pat. No. 6,699,684 Method of monitoring Biofouling membrane separation processes
19. U.S. Pat. No. 6,730,227 Method of monitoring membrane separation processes
20. U.S. Pat. No. 6,821,428 Method of monitoring membrane separation processes
21. U.S. Pat. No. 6,838,001 Method of monitoring membrane separation processes
22. U.S. Pat. No. 6,838,002 Method of monitoring membrane separation processes
23. U.S. Pat. No. 7,060,136 Method of monitoring membrane cleaning processes
24. U.S. Pat. No. 7,169,236 Method of monitoring membrane cleaning processes
25. U.S. Pat. No. 6,475,394 Pseudo-fouling detector and use thereof to control an industrial water process
26. U.S. Pat. No. 6,017,459 Apparatus and method for the monitoring of membrane deposition
27. U.S. Pat. No. 7,252,096 Methods of simultaneously cleaning and disinfecting industrial water systems 28. Ooe Kenji and Okada Shingo, "eCUBE aqua" application portfolio for reverses osmosis membrane diagnosis. Yaokogawa Technical Report English Edition No 38 (2004).

29. Masaaki Sekino, Mass Transfer Characteristics of Hollow Fiber RO Modules, Journal of Chemical Engineering of Japan, 28 (1995) 843-846

What is claimed is:

1. A method for real time performance management of a membrane in a plant controlled by a computer based control system, wherein the performance management of the membrane includes monitoring of fouling of the membrane taking place during a membrane separation process, and cleaning of the membrane for restoration of performance of the membrane, the method comprising:

measuring a plant process variable in real time during the fouling of the membrane; and processing the measured plant process variable in the computer based control system by:

storing the real time measurement of the plant process variable;

estimating, at periodic instants in time during the fouling of the membrane, time varying physical parameters of the membrane from the stored real time measurement of plant process variable using a mathematical model, the physical parameters including at least a hydrodynamic permeability of the membrane and a solute permeability with respect to the membrane;

analyzing the estimated time varying physical parameters to determine a time varying rate of fouling;

predicting a state of fouling of the membrane based on the determined time varying rate of fouling and estimating a scheduled time for the cleaning of the membrane based on a comparison of the estimated time varying physical parameters with predefined threshold values at a respective periodic instant of time during the fouling of the membrane; and scheduling the cleaning of the membrane based on the estimated schedule time for the cleaning of the membrane by the computer based control system;

sending a signal to an operator panel for recommending the cleaning of the membrane based on the estimated schedule time for cleaning; and cleaning of the membrane at the estimated scheduled time based on the recommendation sent to the operator panel.

2. The method of claim 1, comprising:
on-line or off-line predicting and scheduling.

3. The method of claim 1, wherein the membrane used in a membrane separation process is one of a reverse osmosis, nanofiltration or ultrafiltration.

4. The method of claim 1 wherein real time estimation of the time varying physical parameters of a membrane separation process from the plant data comprises:

processing the data stored in the computer based control system to remove noise; and storing the estimated parameters in the computer based control system.

5. The method of claim 1 wherein the physical parameters of the membrane include the hydrodynamic permeability of the membrane, the solute permeability with respect to the membrane, and a reflection coefficient of the membrane.

6. The method of claim 4, wherein the plant process variable includes at least one of flow rate, pressure, temperature, and conductivity of feed, flow rate and conductivity of permeate, and pressure of reject stream.

7. The method of claim 4, wherein the computer based control system includes hardware and software of a distributed control system, a programmable logic controller (PLC) or any microprocessor based embedded system.

8. The method of claim 4 wherein the mathematical model represents one of a hollow fiber, spiral wound or tubular type membrane module.

9. The method of claim 1, wherein on-line measurement of the plant process variables is performed under normal operating conditions.

10. The method of claim 1, comprising:

performing on-line measurement of a plant process variable by introducing at least one disturbance in any one process variable.

11. The method of claim 1 for scheduling cleaning of the membrane, comprising:

formulating an empirical model to characterize changes in the physical parameters of the membrane;

analyzing the estimated physical parameters of the membrane by comparing each estimated physical parameter with a predefined threshold value; and recommending membrane cleaning when the predicted physical parameter of the membrane exceeds the predefined threshold value.

12. The method of claim 1, comprising:

validating the mathematical model based on a comparison of estimated time varying physical parameters of the membrane with the stored real time measurements of the plant process variable.

* * * * *